US 9,813,372 B2

United States Patent
Canton

(10) Patent No.: US 9,813,372 B2
(45) Date of Patent: Nov. 7, 2017

(54) SYSTEM AND METHOD FOR INCORPORATING CHAT ELEMENTS INTO A COMMUNICATION INTERFACE

(71) Applicant: BlackBerry Limited, Waterloo (CA)

(72) Inventor: Raymond Lee Canton, Kanata (CA)

(73) Assignee: BlackBerry Limited, Waterloo, Ontario (CA)

( * ) Notice: Subject to any disclaimer, the term of this patent is extended or adjusted under 35 U.S.C. 154(b) by 272 days.

(21) Appl. No.: 13/946,442

(22) Filed: Jul. 19, 2013

(65) Prior Publication Data

US 2015/0026269 A1    Jan. 22, 2015

(51) Int. Cl.
H04L 12/58    (2006.01)
G06Q 10/10    (2012.01)
G06Q 50/00    (2012.01)
H04W 12/02    (2009.01)

(52) U.S. Cl.
CPC ............ H04L 51/32 (2013.01); G06Q 10/10 (2013.01); G06Q 50/01 (2013.01); H04L 51/04 (2013.01); H04L 51/046 (2013.01); H04L 51/36 (2013.01); H04W 12/02 (2013.01)

(58) Field of Classification Search
CPC ....... H04L 51/04; H04L 51/046; H04L 51/32; H04L 51/36; G06Q 50/01; G06Q 10/10
USPC .......................................................... 709/206
See application file for complete search history.

(56) References Cited

U.S. PATENT DOCUMENTS

| 8,832,190 | B1 * | 9/2014 | Leske ................... H04L 51/32 709/204 |
| 8,832,212 | B1 * | 9/2014 | Shah .......................... 709/206 |
| 8,832,569 | B2 * | 9/2014 | Chen ................... G06Q 10/10 715/758 |
| 2004/0259569 | A1 * | 12/2004 | Eason ................... H04W 8/24 455/456.1 |
| 2006/0112036 | A1 * | 5/2006 | Zhang et al. ................. 706/20 |
| 2007/0220092 | A1 | 9/2007 | Heitzeberg et al. |
| 2007/0288601 | A1 * | 12/2007 | Barkley et al. .............. 709/219 |
| 2008/0052759 | A1 | 2/2008 | Kronlund et al. |
| 2009/0083383 | A1 | 3/2009 | Piper et al. |

(Continued)

FOREIGN PATENT DOCUMENTS

WO    WO 2008/023926 A2    2/2008

OTHER PUBLICATIONS

Frey, Richard; Search Report from corresponding European Application No. 14177104.8; dated Nov. 28, 2014.

(Continued)

Primary Examiner — Ramy M Osman
(74) Attorney, Agent, or Firm — Jose Gutman; Fleit Gibbons Gutman Bongini & Bianco P.L.

(57) ABSTRACT

A method performed by a first mobile device is provided. The method comprises: detecting an activity update to an account associated with the first mobile device; communicating the activity update to at least one account contact; receiving a response to the communicated update from the at least one account contact; displaying in a display of the first mobile device: an activity update view having the response appended to the activity update; and a messaging view of a messaging session between the account and the at least one account contact, the messaging view displaying the activity update in association with the response.

19 Claims, 13 Drawing Sheets

(56) References Cited

U.S. PATENT DOCUMENTS

| | | | |
|---|---|---|---|
| 2009/0215469 A1* | 8/2009 | Fisher | H04L 51/32 455/456.3 |
| 2010/0005402 A1* | 1/2010 | George | H04L 51/04 715/758 |
| 2010/0153505 A1* | 6/2010 | Oh | G06Q 10/107 709/206 |
| 2011/0126258 A1* | 5/2011 | Emerson | H04L 51/04 725/133 |
| 2011/0191406 A1* | 8/2011 | Plunkett et al. | 709/203 |
| 2011/0196935 A1* | 8/2011 | Rideout et al. | 709/206 |
| 2012/0059887 A1* | 3/2012 | Oberle | H04L 51/04 709/206 |
| 2012/0158935 A1* | 6/2012 | Kishimoto | G06Q 50/01 709/223 |
| 2013/0132861 A1* | 5/2013 | Kienzle | G06Q 50/01 715/753 |
| 2013/0145389 A1* | 6/2013 | Jacoby | H04L 51/04 725/14 |
| 2013/0191762 A1* | 7/2013 | Rajagopalan | H04L 51/32 715/753 |
| 2013/0246525 A1 | 9/2013 | Patil et al. | |
| 2013/0305164 A1* | 11/2013 | Karunamuni et al. | 715/752 |
| 2014/0164502 A1* | 6/2014 | Khodorenko | H04L 67/325 709/204 |
| 2014/0222429 A1* | 8/2014 | DeLand | H04L 51/046 704/251 |

OTHER PUBLICATIONS

European Examination Report dated Sep. 30, 2016, received for European Application No. 14177104.8.

* cited by examiner

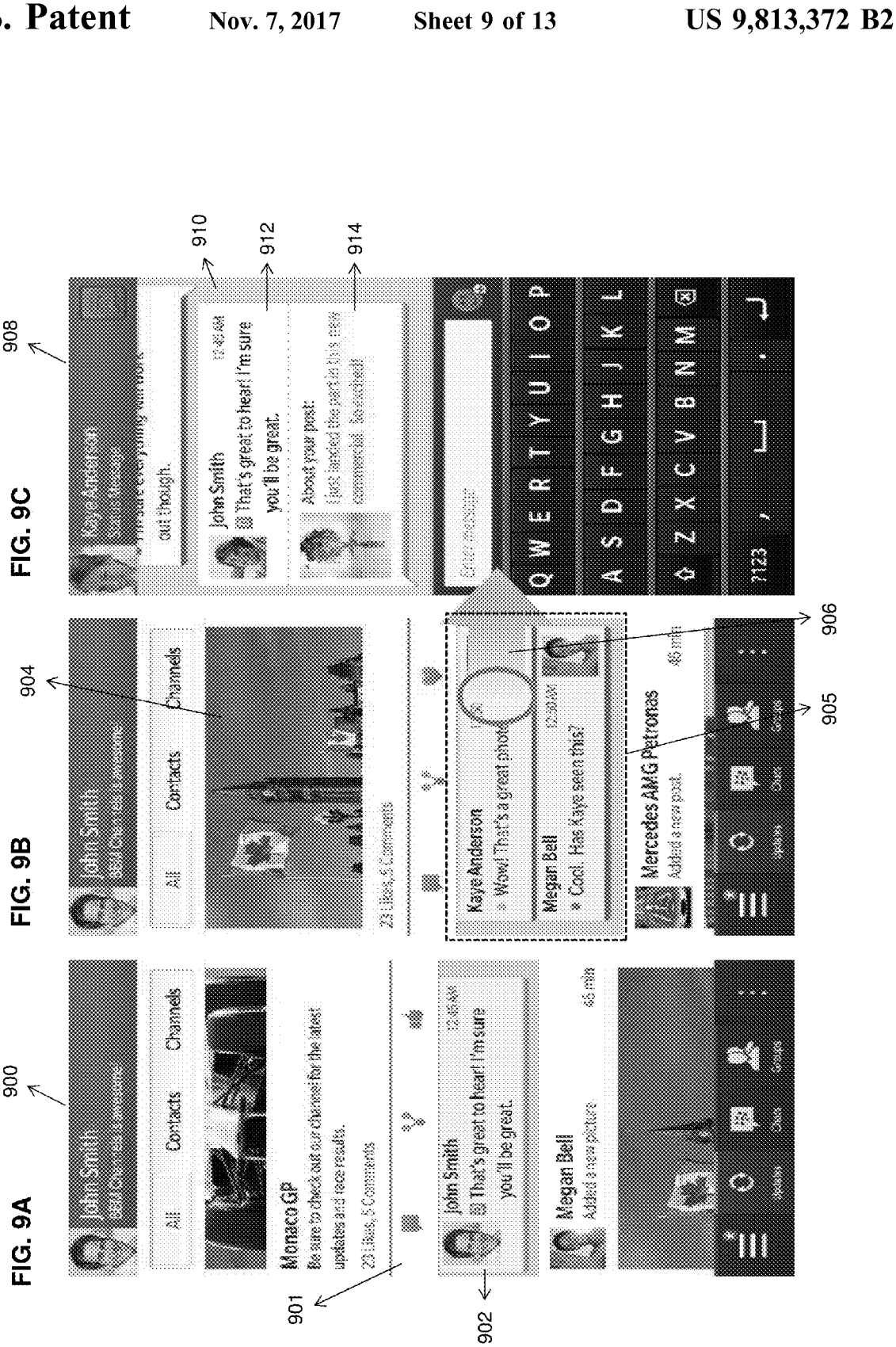

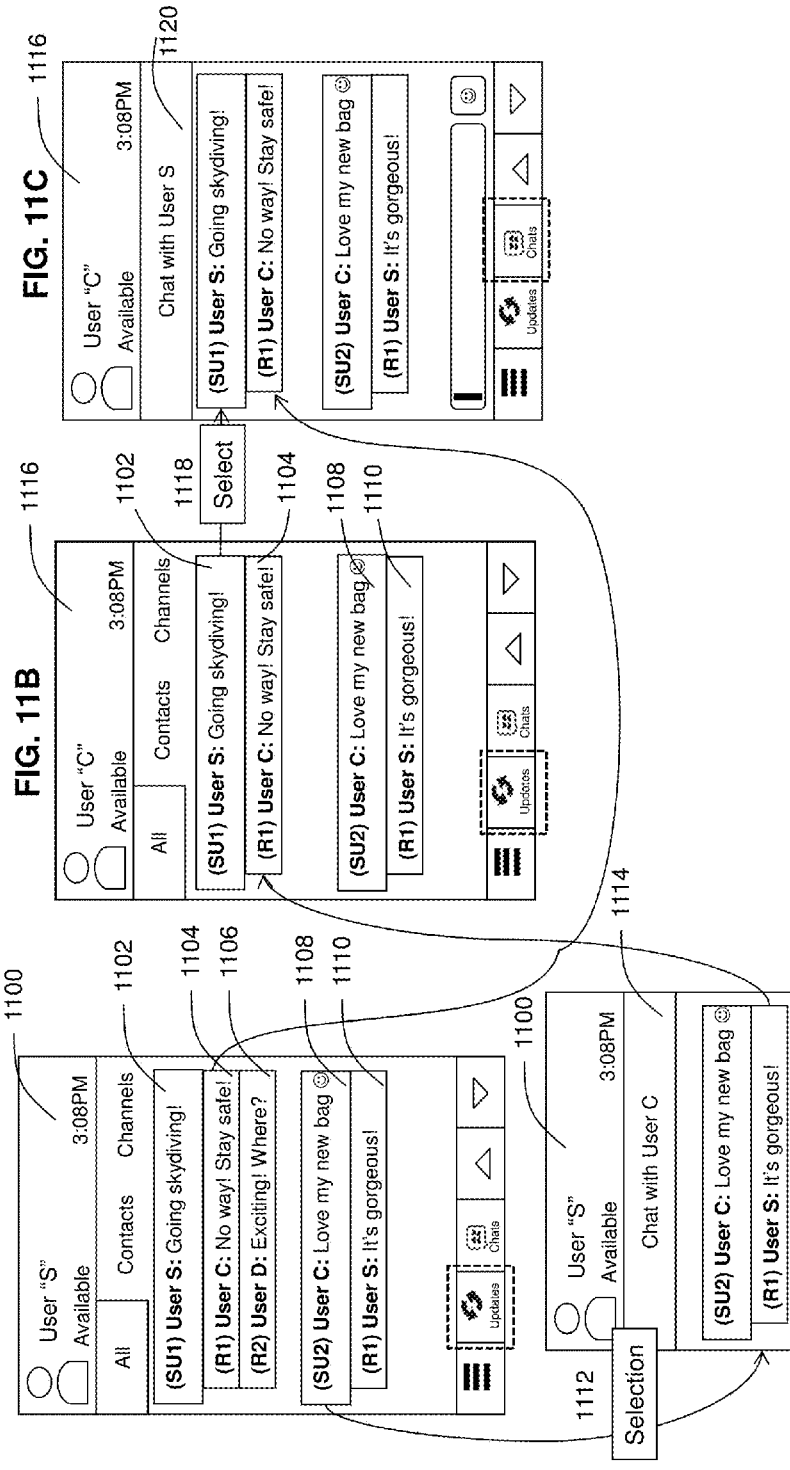

SYSTEM AND METHOD FOR INCORPORATING CHAT ELEMENTS INTO A COMMUNICATION INTERFACE

TECHNICAL FIELD

The following relates to a method and system for operating a communication interface on a mobile device, and specifically for incorporating a chat element such as a chat stub from a messaging session related to an activity update into the communication interface.

BACKGROUND

Mobile communication devices are known to include IM or other conversational type message exchanges, and to post or receive social networking updates. However, there are often issues around privacy of comments related to social networking updates as it is broadcast or available to all contacts that are linked to the user posting the update. Furthermore, the distinction between private and public communications is not defined in terms of status updates or posts for users in an IM interface. In addition, a user often will need to switch between different interfaces of the IM or separate applications altogether in order to carry on private conversations with a contact distinct from the updates status interface.

As such, having to switch between separate applications or interfaces in order to carry on private communication exchanges related to status updates or posts in an IM interface can be an impediment to the usability of the mobile communication device.

Accordingly, there exists a need for a method and/or system to obviate and mitigate the disadvantages presented herein.

BRIEF DESCRIPTION OF THE DRAWINGS

Embodiments will now be described by way of example only with reference to the appended drawings wherein:

FIGS. 9A-9C and 10A are exemplary screen shots of the instant messaging user interface for devices generating an update post and responding to the update post via chat stubs;

DETAILED DESCRIPTION

Figure 1:
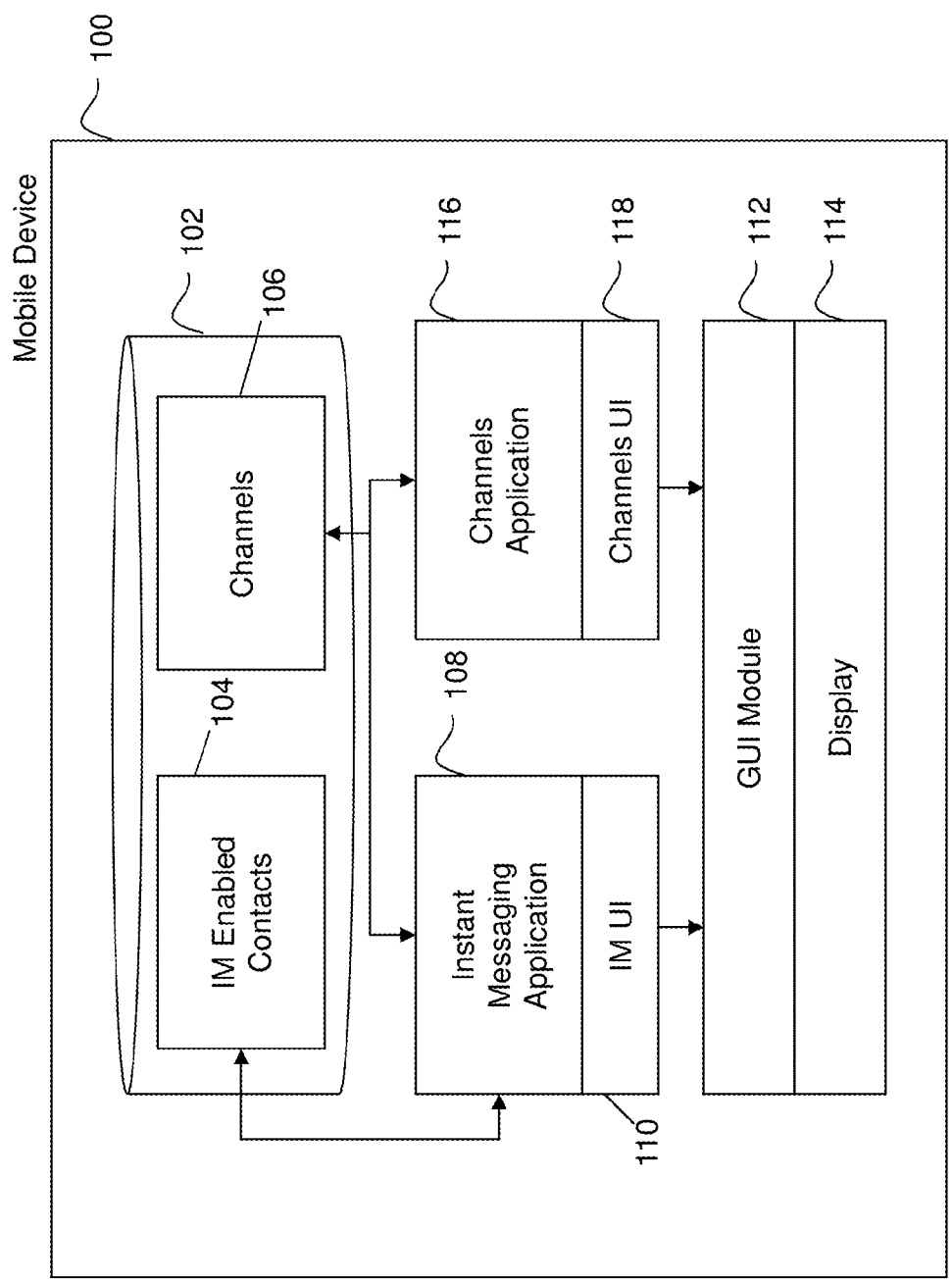
FIG. 1 is an exemplary configuration of a mobile communication device for allowing messaging operations.

In one aspect, there is provided a method performed by a first mobile device, the method comprising: detecting an activity update to an account associated with the first mobile device; communicating the activity update to at least one account contact; receiving a response to the communicated update from the at least one account contact; displaying in a display of the first mobile device: an activity update view having the response appended to the activity update; and a messaging view of a messaging session between the account and the at least one account contact, the messaging view displaying the activity update in association with the response. The messaging session can include an instant messaging (IM) session or a chat session between one or more correspondents. The display is provided in one aspect, subsequent to receiving the response.

In another aspect, the activity update being displayed in association with the response are displayed as corresponding chat elements within the messaging session between the account and the at least one account contact.

In another aspect, the method further comprises upon receiving a selection input of the response in the activity update view, displaying the messaging view of the messaging session between the account and the at least one account contact.

In another aspect, the selection input initiates the messaging session with the at least one account contact. In yet another aspect, the method further comprises: communicating the activity update to a plurality of account contacts, receiving a plurality of respective responses from the plurality of account contacts; displaying in the display of the first mobile device: the activity update view having each of the plurality of respective responses appended to the activity update; the messaging view with each of the plurality of account contacts displaying the activity update and an associated response from the plurality of respective responses.

In yet another aspect, the method further comprises: upon receiving a selection input of one of the plurality of respective responses in the activity update view, initiating the messaging session between the contact and a corresponding account contact of the plurality of account contacts.

In yet another aspect, the messaging session comprises a chat session.

In yet another aspect, the method is performed in an instant messaging interface (IM) of the mobile device and the messaging session comprises an instant messaging session.

In yet another aspect, the response displayed on the activity update view comprises at least a portion of the messaging session related to the activity update between the account and the at least one account contact.

In yet another aspect, the display of the response in the activity update is confidential between the account and the at least one account contact participating in the messaging session related to the activity update. In one aspect, the response displayed on the activity update view further comprises a visual indicator to indicate whether the response is delivered or read by the account. In one aspect, the method further comprises receiving a subsequent response from the at least one account contact associated with the activity update in the messaging session and replacing the response with the subsequent response appended to the activity update in the activity update view.

In yet another aspect, the method further comprises receiving at least one subsequent response from the at least one account contact associated with the activity update in the messaging session and further appending the at least one subsequent response with the response appended to the activity update in the activity update view.

In one aspect, the plurality of respective responses is displayed in chronological order of occurrence.

In one aspect, displaying the activity update view having each of the plurality of respective responses appended to the activity update further comprises: displaying a group icon indicating a summarized view of the plurality of respective responses, the summarized view selectable for expanding the group icon and displaying each of the plurality of respective responses in the activity update view.

In one aspect the activity update is selected from the group comprising: a status update and a new post initiated by the account.

In one aspect, there is provided a computer readable medium comprising computer executable instructions that when executed by a computing device cause the computing device to operate according to the method described herein.

In one aspect, there is provided a computing device comprising a processor and memory, the memory storing computer executable instructions that when executed cause the processor to operate according to the method described herein.

In one aspect, there is provided a method for exchanging messaging (IM) data between a first and second correspondent devices, the method comprising: receiving an activity update from the second correspondent device at the first correspondent device; displaying the activity update on an IM user interface at each of the first and the second correspondent devices; receiving a selection of the activity update at the first correspondent device; initiating a chat session at the first correspondent device between the first and second correspondents in response to the selection; generating a chat element at the first correspondent device in response to at least a portion of a conversation in the chat session; communicating the chat element from the first correspondent device to the second correspondent device, the chat stub private to the first and second correspondent devices; and, displaying the chat element on respective IM interfaces at the first and second correspondent devices appended to the activity update. A computing device comprising a processor and memory, the memory storing computer executable instructions that when executed cause the processor to operate according to the method of exchanging IM data.

To simplify the accessibility and privacy control of responses (e.g. comments) in relation to activity updates (which include for example status updates/posts posted by a user or their contacts) and viewable by the associated contacts in a communication interface (such as an instant messaging (IM) user interface) on a mobile device, there is provided a system and method which allows a user of a mobile device to select a status update or post for a particular contact or channel or group (e.g. on the update screen of the IM interface) and, in response, for the user's mobile device to initiate a messaging session such as a chat session (e.g. on the chat screen of the IM interface) between the user and the particular contact (or channel or group as applicable).

It is noted that the contact that generates a status update or a post in the IM interface (e.g. as displayed in the IM updates feed) can include, but are not limited to: a contact defined in an IM contact list database, and any contact or messaging group or channel that generates updates or posts. That is, a user of an IM messaging application on a mobile device may be subscribed to a post source (e.g. a channel or group) and thereby the update/post source or channel that the user subscribes to and is a source of updates/posts is considered a contact of the user for the IM application as discussed in the present application.

As can be envisaged, the IM contact list can further include contacts that are not configured for IM messaging directly, that is a user of another mobile device who uses text messaging can be a contact in IM applications.

In another aspect, once a user of a mobile device posts an activity update via a communication interface (e.g. an update status or other post) then the activity update is provided to all contacts associated with the user's account in the communication interface (e.g. IM application). Subsequently, after receiving a response to the activity update (e.g. status update/post) from a contact in the IM application, the mobile device appends the response to the activity update in an update screen view (also referred to as a timeline view). Furthermore, the mobile device displays in an instant message view (or chat session view) on the display the activity update and the associated response as chat elements within the instant message view. The chat element is also referred to as a chat stub herein and includes for example, a portion of the conversation or a representative of the chat session or a chat statement that is provided in response to an activity update. The chat element can include a pointer or a reference to a point in the instant messaging conversation between the user of the mobile device and the contact regarding the activity update. Accordingly, in one aspect, by selecting the response on the update screen view, the chat element is selected and the instant messaging session between the user and the contact is initiated such that an instant messaging view includes the activity update and the response as chat elements.

In one aspect, the chat element or stub as described below includes on the update screen of the IM interface, a visual display of a time stamp for the conversation associated with the status update or post and/or a visual indication of whether the chat stub has been delivered or read by the other party (e.g. the intended recipient of the message) in the chat session.

In this manner, although an activity update (e.g. status update or post) posted by a host user via their IM may be viewable to a number of contacts (e.g. on their IM contact list) and is broadcast from the user's mobile device to each of the corresponding contacts mobile devices, the responses on a status update or post are only viewable by the user that generated the status update or post and the corresponding party that responded within a chat session on the contact's IM interface. That is, each of the contacts can respond by selecting the user's post and initiating a chat session. Specifically, the status update is viewable on each contact's update screen of the IM interface (e.g. on each contact's mobile device) and a particular contact can select via the IM interface, the externally initiated status update and initiate a chat session with the user. Portions of the electronic conversation from each of the contacts with the user (in relation to the user's status update) are extracted as chat stubs (e.g. the most recent portion of a conversation) and provided from each of the contact's mobile devices to the user's mobile device. The IM interface of the user's mobile device then appends the chat stubs from each contact to user's status update on the user's update screen. Conversely, on each of the contact's mobile devices, only the chat stubs and chat conversations between the user and the contact related to the user initiated status update are displayed and accessible on the contact's IM interface. In this manner, each response provided from a contact's mobile device in relation to a status update is pulled or pushed from the chat session initiated on the contact's mobile device and appended, via the user's mobile device, on the status update in the update screen of the IM interface on the user's device. In this manner, there is provided a mechanism of cross-linking a chat session with a status update or post on an IM interface of a mobile device, such that chat stubs from a particular chat session initiated by a user on a second mobile device regarding a status update or post received from a user on a first mobile device are then provided to the first mobile device for posting in relation to the status update. In addition, in one aspect, this chat stub is also posted on the second mobile device's update screen (e.g. appended or other visual link or indicator to the update status or post) on the IM interface. In this way, there is privacy and control provided in the social network associated with the IM environment.

It is noted that the status updates discussed herein can refer to any type of status messages, posts, pictures, videos, text or other modifications indicating a new post or update for a user and/or their contacts in a social network environment of the IM. It is also noted that status updates and posts are used interchangeably to refer to any updates posted by a user in an IM interface (e.g. the update screen of an IM). Conversely, an update screen on an IM is configured to display status updates, posts (e.g. text, video, pictures) and other events posted by the user and/or their contacts in a social networking environment provided by the IM.

Examples of chat stubs, also referred to as chat elements herein as related to an activity update on a communication interface such as instant messaging includes, without limitation: a chat statement representative of the conversation between the chat participants in response to the activity update, a portion of the conversation between the users, the last message within the conversation between the users, other visual or textual representation of the conversation between the users related to the activity update. In one aspect, the chat stubs includes a timestamp of a moment in a conversation in the IM chat in addition to a portion of the conversation. In one aspect, chat stubs are part of an IM (e.g. BlackBerry® Messenger (BBM)) chat initiated around an update post.

As described herein, in one embodiment, chat stubs are private and peer to peer. That is, only the users in the IM chat conversation can see it in the timeline (only displayed on the IM interface of mobile device(s) involved in the IM chat). In another aspect, when the conversation ends in the IM chat, the IM interface of each of the mobile devices involved in the IM chat are configured to remove the display of the chat stub.

In another aspect, the IM interface of a mobile device is configured to allow public comments on a user's status updates or posts in the update screen of an IM interface. The difference between a public comment and a chat stub is that the chat stubs are private and peer-to-peer while the public comments are available for viewing to all contacts of a user that can see the user's status updates. That is, public comments on a post in an IM are ongoing, communal and less time dependent and they are shown when a user opens post details. On the other hand, in one aspect, chat stubs are preferably time dependent and immediate (such that indicators are shown to display whether Read or Delivered) and bubbled up into the updates feed (also referred to as the updates screen herein) and attached to a post on the IM interface. Preferably, this separation of visibility facilitates delineating the direct and private communications (e.g. chat stubs) from the open and public discussion (e.g. public comments posted by others) on a user's status updates or posts.

In one aspect, the recent text of a conversation in an IM chat may be truncated for displaying the chat stub. In this aspect, the IM interface displaying the chat stub includes a text limit display for the chat stub in the update screen interface.

As will be shown in greater detail below, chat stubs derived from an IM chat session between a contact and a host user as related to an IM post/status update from the host user can be routed to the IM updates interface for the host user's mobile device.

Although the following examples are presented in the context of mobile communication devices, the principles may equally be applied to other devices such as applications running on personal computers and the like.

For clarity in the discussion below, mobile communication devices are commonly referred to as "mobile devices" for brevity. Examples of applicable mobile devices include without limitation, cellular phones, cellular smart-phones, wireless organizers, pagers, personal digital assistants, computers, laptops, handheld wireless communication devices, wirelessly enabled notebook computers, portable gaming devices, tablet computers, or any other portable electronic device with processing and communication capabilities.

FIG. 1 illustrates an example configuration of a mobile device 100 configured to communicate with IM contacts 104 and channels 106 in an IM user interface 110. In one exemplary embodiment, channels 106 refer to subscribed pages and/or feeds that can broadcast and/or shared information for followers/subscribers to view, the posts by the channel 106 can include, but are not limited to: a particular theme associated with a certain topic, product, and/or business. In this embodiment, a memory 102 is shown which stores both IM enabled contacts 104 and information on subscribed channels 106 such as the pin number associated with the channel 106. Other forms of contacts may also exist on the device 100, such as SIM contacts. It will be appreciated that such contacts may be stored in separate portions of memory or can be accessed from an amalgamated list, e.g. an electronic address book (not shown). In this example, IM enabled contacts 104 are part of a separate and distinct IM contact list that is built and maintained for and by an IM application 108. Other contacts may be part of an address book or correspond to data that is temporarily stored (e.g. incoming telephone calls, etc.).

The IM application 108 has access to the IM contacts 104 for display via an IM user interface (UI) 110. Similarly, a channels application 116 has access to information on subscribed channels 106 for display via a channels user interface 118. The mobile device 100 also comprises a GUI module 112 which utilizes the IM UI 110 as well as channels UI 118 to present information and data to the user via a display 114.

It is noted that in another configuration of the mobile device 100, the IM enabled contacts 104, IM messaging application 108 and IM UI are provided without the channels 106, channels application 116 and channels UI being present.

In the configuration shown in FIG. 1, however, it can be seen that the IM application 108 is accessible to and/or can access the channels 106 in order to incorporate channels 106 into the IM UI 110. It can be appreciated that only one example configuration is shown in FIG. 1 and that the IM application 110 could instead, for example, obtain channels 106 data by accessing the channels application 116 or channels UI 118.

Figure 2:
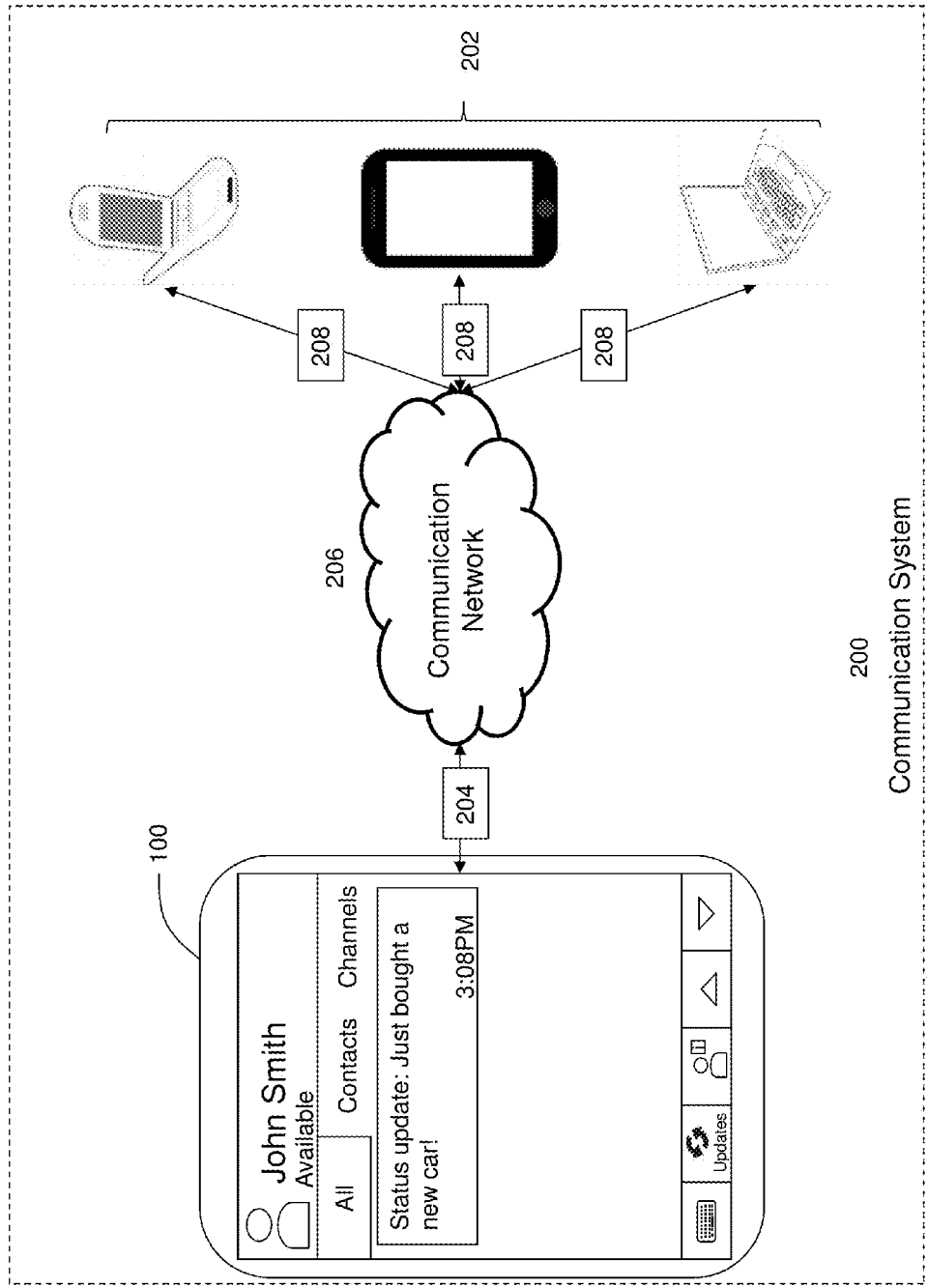
FIG. 2 is a block diagram of an example of a communication system comprising a host mobile device communicating with one or more communication devices across a communication network.

FIG. 2 illustrates an exemplary communication system 200 according to one embodiment of the invention. The system 200 comprises the mobile device 100 and one or more other communication devices 202 communicating information related to IM messaging operations (e.g. status updates, posts, channel updates or posts, and other IM related activity) between the mobile device 100 and other communication devices 202. The IM messaging operations are provided by IM Application 108, IM UI 110 and/or IM enabled contacts 104 shown in FIG. 1. The mobile device 100 is also referred to as a host mobile device herein. The other communication devices 202 are computing devices such as a mobile computing device associated with contacts on a contact list for the IM interface (e.g. contacts 104 in FIG. 1). The mobile device 100 is able to communicate with one or more other communication devices 202 through a communication network 206. The communication network can include, but is not limited to: Wi-Fi, RF transmission, GSM, CDMA, GPRS, W-CDMA, EDGE, and CDMA2000.

The host mobile device 100 can use data packets 204 in order to send and receive data from the communication network 206. One or more mobile communications device 202 can use data packets 208 to send and receive data across the communication network 206. These data packets 204 and 206 can send information that includes, but is not limited to: IM Status update, IM update posts, IM chat packets, chat stubs, timing related to chat stubs, read/delivered notifications for chat stubs and for IM chat conversations, IM event related information, and multi-cast messages.

Figure 3:
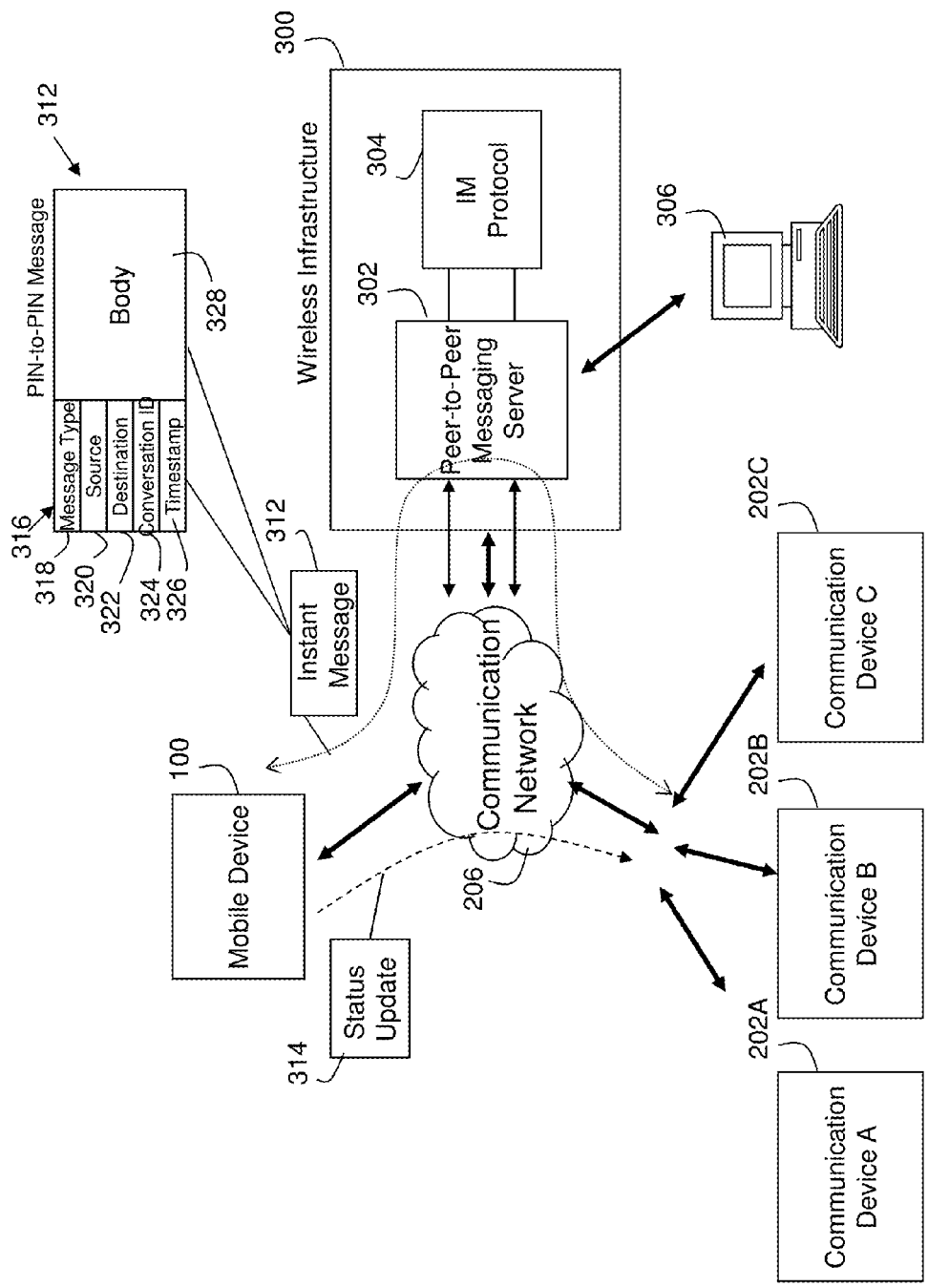
FIG. 3 is a system diagram showing one configuration for exchanging instant messages and status updates on multiple platforms.

Turning now to FIG. 3, a further embodiment of the communication system 200 is shown as a messaging system 201 configured to allow the mobile device 100, to send IM messages (e.g. 312) to buddies or contacts included in their IM contact list 104 (shown in FIG. 1) or to subscribers of their channel 106 (shown in FIG. 1) via communication devices 202A, 202B and/or 202C. It can be seen in FIG. 3 that two exemplary messaging configurations of this messaging system 201 are shown. A first configuration incorporated into the communication infrastructure 300 of the communication network 206 is shown, which in this example is a peer-to-peer based system, e.g. a personal identification number (PIN)-based messaging system, that utilizes a device such as a server or router provided by the communication infrastructure 300.

In the embodiment illustrated in FIG. 3, a PIN-based messaging system is implemented using a server-based communication infrastructure, such as one that provides email, SMS, voice, Internet and other communications. Particularly suitable for hosting a peer-to-peer messaging server 302 is a wireless router or server used in systems such as those that provide push-based communication services. In FIG. 3, the communication infrastructure 300 facilitates communications such as instant messaging on the mobile device 100 and communications devices for User A, User B and User C, denoted by 202A, 202B and 202C respectively, using a peer-to-peer messaging server 302. It will be appreciated that the number of users and communication devices (e.g. 202A, 202B, and 202C) participating in the example shown in FIG. 3 is for illustrative purposes only. Instant messaging is provided by an instant messaging program or application stored on each of the mobile device 100 and communication devices (e.g. 202A, 202B, 202C) which can be initiated, for example, by highlighting and selecting an instant messaging icon from a display as is well known in the art. The peer-to-peer messaging server 302 routes messages between the devices according to an IM protocol 304.

An instant message is generally denoted by numeral 312 in FIG. 3, and has a format that is particularly suitable for a PIN-to-PIN based system. In a typical IM protocol 304, each message 312 has associated therewith a source corresponding to the mobile device 100 which has sent the message 312 and includes a destination identifying the intended recipient. Further detail of an example structure for the messages 312 is also shown in FIG. 3. Each message 312 generally comprises a body 328, which contains the content for the message 312 (e.g. text), and a header 316, which contains various fields used for transmitting and processing each message 312. In this example, the header 316 includes a message type field 318 to specify the type of transmission (e.g. PIN, channel message etc.), a source field 320 to specify the device address for the sender, a destination field 322 to specify the device address for the intended recipient, a conversation ID field 324 to identify which conversation thread the message 312 corresponds to (e.g. such that each message 312 is identified by the conversation in which it was sent), and a timestamp field 326 to indicate the time (and if desired, the date) at which the message 312 was sent by the designated sender.

It will be appreciated that other information or attributes may be included in the message 312, such as a subject field (not shown) to enable a subject for part or all of the conversation to be transported with the message 312 (e.g. to create new subjects, modify subjects, notify others of subjects, etc.). Although not shown in FIG. 3, one or more tags can also be used to indicate to the instant messaging application 108 (shown in FIG. 1), upon receipt of a message 312, that the message 312 has certain attributes such as a subject that is to be displayed, whether additional information is being transported (i.e. data or information in addition to the message content), or whether the message 312 is being used for some other purpose such as provisioning, synchronization, etc.

In general, in an IM protocol 304, the sender of the message 312 knows the source address of the intended recipient, e.g. a PIN. This may be established when the two devices request to add each other to their respective contact or buddy lists. At the time of requesting new contacts, in traditional IM protocols 304, the two respective PIN numbers may be exchanged via request e-mails which are configured to be intercepted by the respective instant messaging applications 108 so as to not appear in the message list or "inbox" of the user. In other embodiments, to avoid the exchange of email messages to add a buddy to the IM contact list 104, a global address list (GAL) application (at the host system—not shown) may instead be accessed in order to obtain the source address for the intended recipient directly. Alternatively, the user may simply ask for the source address from another user and enter it manually.

It can be seen in the example shown in FIG. 3 that the mobile device 100 can communicate directly with any of the other communication devices 202A-202C through the peer-to-peer messaging server 302 as indicated by the short-dashed line. Messaging can also be accomplished by the broadcasting of status updates or posts 314 to IM contacts 104 (shown in FIG. 1).

When conducting an instant messaging (IM) session via the IM interface (e.g. 110 in FIG. 1) according to the embodiment shown in FIG. 3, the mobile devices 100 and other communication devices 202A-C can communicate directly with the communication infrastructure 300 in a client based exchange where, similar to other peer-to-peer programs, an intermediate server is not required. A message 312 sent by one mobile device 100 is received by the communication infrastructure 300, which obtains the source address for the intended recipient from information associated with the message 312 (e.g. a data log) or from the message 312 itself. Upon obtaining the recipient's address according to the IM protocol 304, the communication infrastructure 300 then routes the message 312 to the recipient associated with the mobile device 100 having such address. The communication infrastructure 300 typically also provides a delivery confirmation to the original sender, which may or may not be displayed to the user. The destination device can also provide such delivery information. The communication infrastructure 300 should be capable of routing messages 312 reliably and hold onto the messages 312 until they are successfully delivered. Alternatively, if delivery cannot be made after a certain timeout period, the communication infrastructure 300 may provide a response indicating a failed delivery. The communication infrastructure 300 may choose to expire a message 312 if a certain waiting period lapses.

Figure 4:
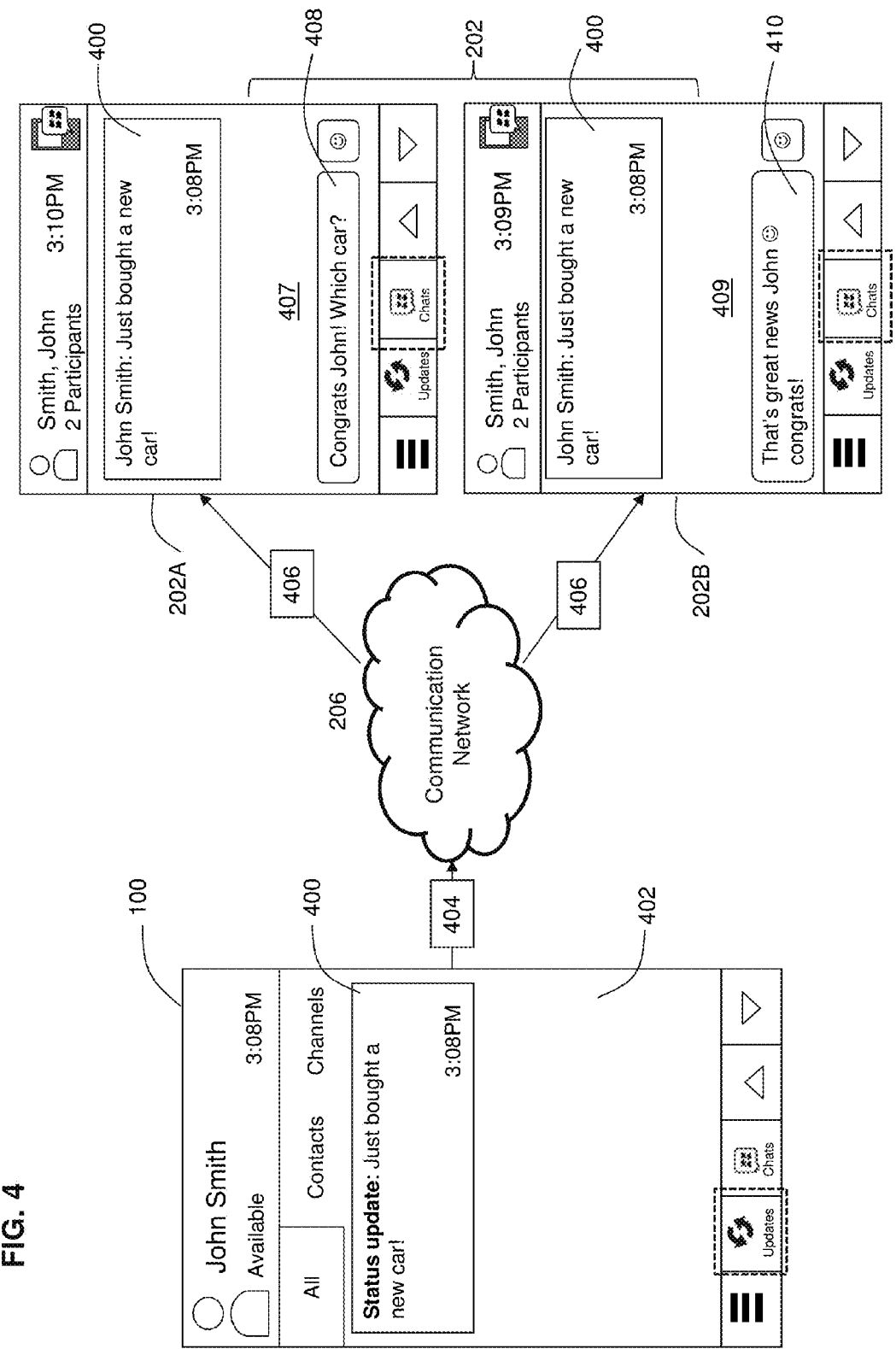
FIG. 4 is a block diagram of an exemplary communication of a status update via the system of FIG. 3.
Figure 5:
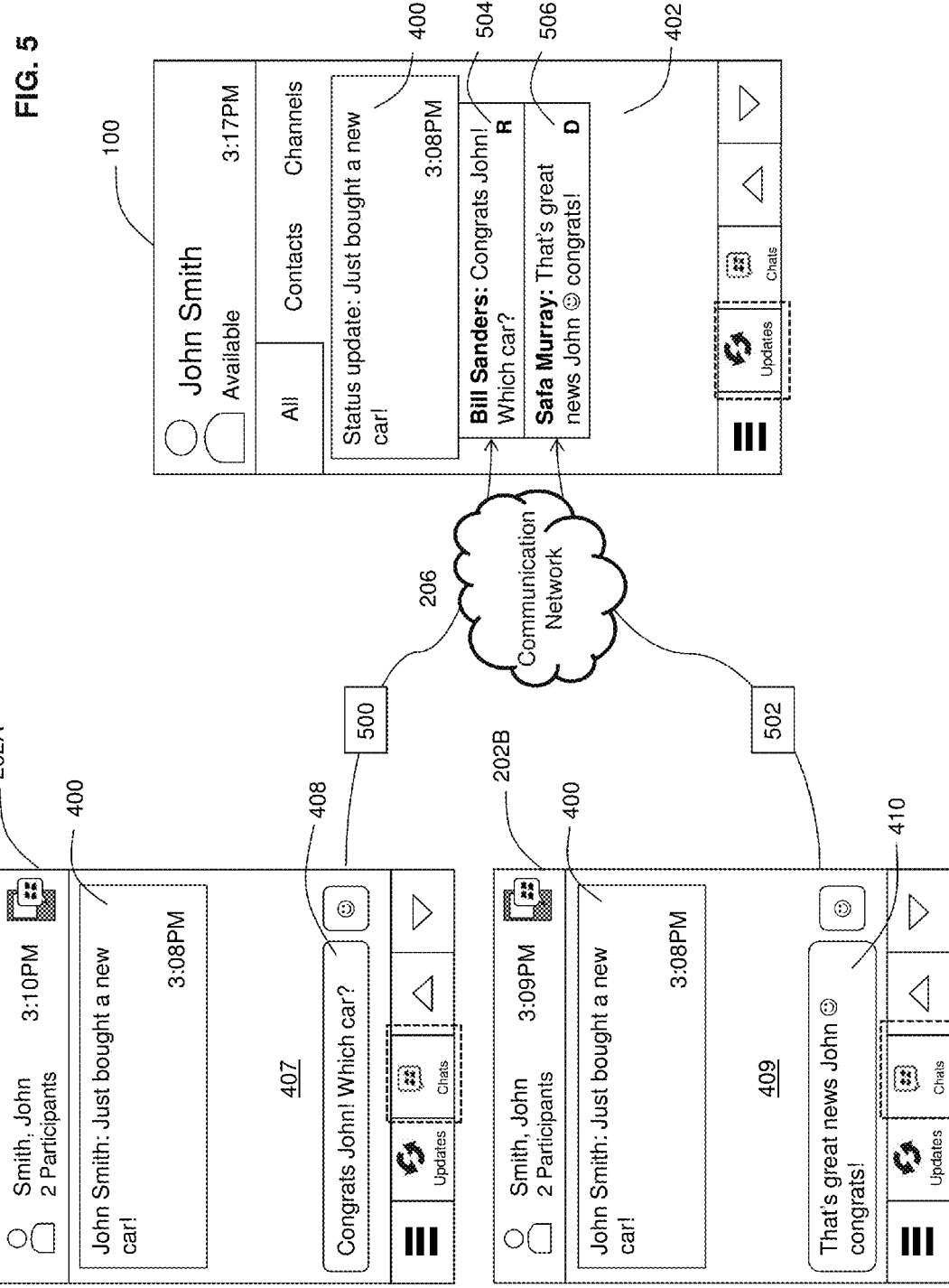
FIG. 5 is a block diagram of an example communication of chat stubs on the status update via the system of FIG. 3.

Referring to FIGS. 4 and 5, a schematic diagram illustrates the exemplary communication of activity updates (e.g. update posts or status updates) initiated by an account of a first mobile device 100 to one or more other communication devices 202 (e.g. at least one account contact) and the responses received from the other communication devices 202 in the form of chat stubs. As described above, the chat elements or stubs are portions of a conversation initiated in a chat session between a particular respondent to the post (e.g. a particular communication device 202) and the first mobile device 100. As will be described, a chat session can be initiated on the communication device 202, by selecting the update post generated by the first mobile device 100. A chat stub is appended to an activity update (also referred to as an update post) on an IM interface of the first mobile device for each respondent communication device 202. However, a contact at a communication device 202 that participated in an IM chat session with the user of the first mobile device 100 can only see the chat stub associated with the contact's particular conversation with the user and not other contacts associated with the first mobile device 100 (e.g. other contacts within the IM contact list of the first mobile device or other recipients of the update post from the first mobile device 100 are unable to see each other's responses shown as chat stubs). In this manner, chat stubs are private and peer-to-peer such that they are distributed between the user of the first mobile device 100 and the particular contact associated with a particular communication device (e.g. 202A) that responded to the update post in a chat session initiated on the particular communication device 202A to generate the chat stub and not distributed to other contacts (e.g. not distributed to 202B).

In this embodiment, the example shown is of a status update by the first mobile device 100 provided to one or more other communications device 202 (e.g. IM contacts of the user of the first mobile device 100). A status post 400 is developed and in one exemplary embodiment, the update is initiated from the device 100 while in the IM application screen (e.g. updates screen 402). The first mobile device 100 transmits the update as packets of data 404 to the communication network 206. The packets can include information on the content of the message, the time it was sent, and etc. The communication network 206 is able to analyze the packets of data 404 and then transmits data packets 406 to one or more communications device 202 (e.g. IM contacts of the user of the first mobile device 100).

Each communication device 202 displays the status update 400 to their respective display associated with their IM application (e.g. in an updates screen of the IM user interface). It should be noted that this is one exemplary method of displaying status update 400, the status update 400 can also be displayed as pop-ups or other notification in other embodiments. Each exemplary device 202 is able to initiate and compose a response on the status update 400 received from the first mobile device 100 as 408 and 410 respectively. As can be seen from FIG. 4, all recipients are sent the status update 400 at the same time. However, the recipients can respond and provide a private or peer to peer comment on the status update 400 by initiating a private chat session at different times. In one example, device 202A displays "John Smith's" update post 400 (e.g. post from the first mobile device 100) in an updates screen of the IM interface for device 202A. Subsequently, a user of device 202A "Bill Sanders" can select (e.g. by tapping) the update post 400 and to initiate a chat session with the user of the first mobile device "John Smith" relating to the post 400. The response 408 provided by the contact ("Bill Sanders") associated with communication device 202A is used to form a chat stub provided to and displayed on only the IM interface of communication device 202A and the IM interface for user ("John Smith") of the first mobile device 100 that are part of the conversation in this chat session (e.g. chat session 407). A separate chat session 409 with communication device 202B is also shown.

FIG. 5 refers to communications device 202A and 202B communicating responses on status update 400 as chat stubs visible only to the parties that generated the post (e.g. 400) and associated with the chat session (e.g. 407 or 409) for responding to the post (e.g. 400). In one exemplary embodiment, communications device 202A and 202B are able to communicate the responses as chat stubs 408 and 410 using data packets 500 and 502 respectively, across a communications network 206 to the first mobile device 100. As described earlier, the chat stub can include: at least a portion of the conversation in a chat session between the user of mobile device 100 and a particular contact associated with communication device 202, or the most recent part of the conversation or the response to the post 400. The chat stubs are displayed on the broadcasting device (e.g. mobile device 100) that generated the post 400 preferably in chronological order as 504 and 506 on the update screen 402. The chat stubs can be denoted with either R or D. R can be a means to denote that the chat stubs has been read and a D can denote that the chat stub has been delivered. In this particular embodiment the chat stubs are appended under the status update or post 400 but it can be appreciated that the display of the chat stubs (e.g. 504, 506) can be modified to different configurations in differing embodiments.

Figure 6:
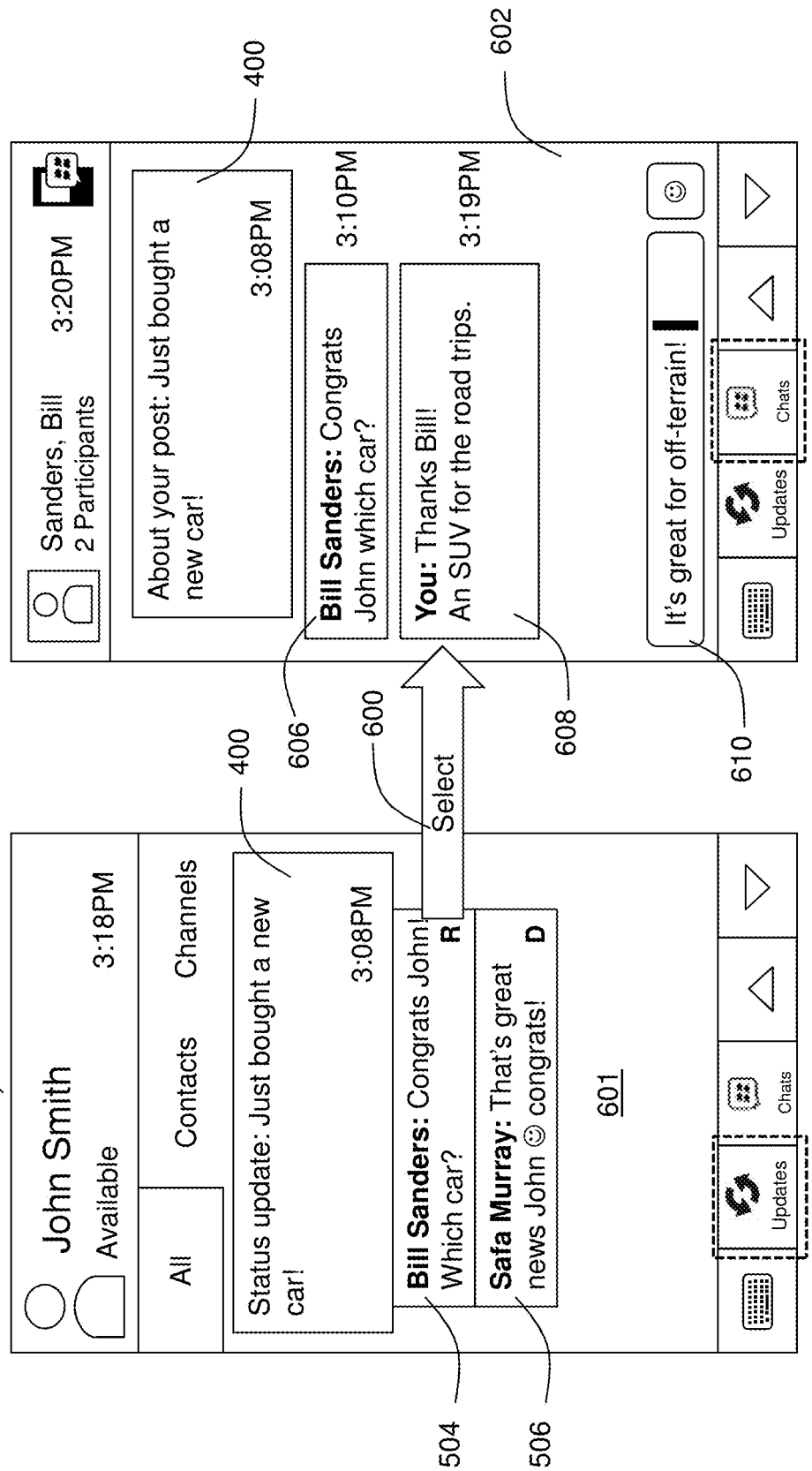
FIG. 6 is a block diagram of an example chat being initiated through a response on a status update shown in FIG. 4.

FIG. 6 illustrates an exemplary initiation of a private chat session in an IM user interface stemming from the selection of a response denoted as a chat stub 504 received from a contact associated with communication device 202A (as shown in FIG. 5) on the status update 400 initiated by the user of the mobile device 100 (e.g. "John Smith"). The updates screen of the IM user interface 601 of the mobile device 100 displays the user initiated status update or post 400 as well as contact initiated responses shown as 504 and 506 originating from different contacts. If a particular chat stub such as 504 is selected by the user of the mobile device 100 at 600, the IM interface of the mobile device 100 initiates a chat conversation in a chat window 602. The selection 600 can consist of a physical clicking of the response shown as a chat stub 504 using the touch sensor of the device 100, or it can be through any other user input selection method available on the device 100. The status update 400 and the response 606 (shown as response 504 in the updates screen) is now shown as chat elements as a part of a chat conversation in the chat window 602 of the IM user interface for the first mobile device 100. The chat session is now a private chat available through the IM application of device 100. Further messages 606 and 608 between the contact (e.g. communication device 202A in FIG. 5) can be a part of the conversation as displayed in the chat window 602. New messages 610 can also be initiated by the user of the mobile device 100 as a part of the conversation by inputting text on the device 100. It can be appreciated that the example shown is one exemplary embodiment of the chat session between the user of the mobile device 100 and a particular contact associated with the communication device 202A such that the status update 400 may or may not be displayed as a part of the conversation in the chat window 602.

As described earlier in relation to chat stubs, they are private and only visible to the correspondent that originates the post/update (e.g. the mobile device 100) and to the respondent to the post that is associated with the chat stub (e.g. the communication device 202A for the chat stub 504). That is the chat stub 504 is only visible to the mobile device 100 and the communication device 202A (e.g. in FIG. 5) while the chat stub 506 is only visible to the mobile device 100 and the communication device 202B (e.g. in FIG. 5. Therefore, a chat stub (e.g. 504) received from a respondent to the post (e.g. device 202A) is not distributed to other recipients of the post or to other contacts of the user for device 100, the chat stub 504 is only provided from the communication device 202A to the device 100 for private viewing and display.

In yet a further aspect of the invention not illustrated in FIG. 6, once further responses are provided in the conversation displayed in chat window 602, then the chat stub 504 is updated to display the most recent section or response in the conversation (e.g. subsequent response 608 in relation to the update post 400 replaces or overwrites response 504). In yet another aspect, the mobile device 100 may be configured to provide the updated chat stub (e.g. 608) to the contact's communication device 202A for display thereon within the update screen of the IM interface (e.g. updating the response 504 with the subsequent response 608 provided in the chat session). In yet a further aspect of the invention not illustrated in FIG. 6, each of the subsequent responses to a status update (e.g. where the first response and a second response are provided by the same contact of the user in a chat session) are further appended to the update post in the update screen (e.g. screen 601). In this manner, when at least one subsequent response is received from the a particular account contact that provided a first response associated with the activity update in the messaging session then the mobile device 100 further appends the at least one subsequent response with the response appended to the activity update (e.g. 400) in the activity update view (e.g. 601).

Figure 7:
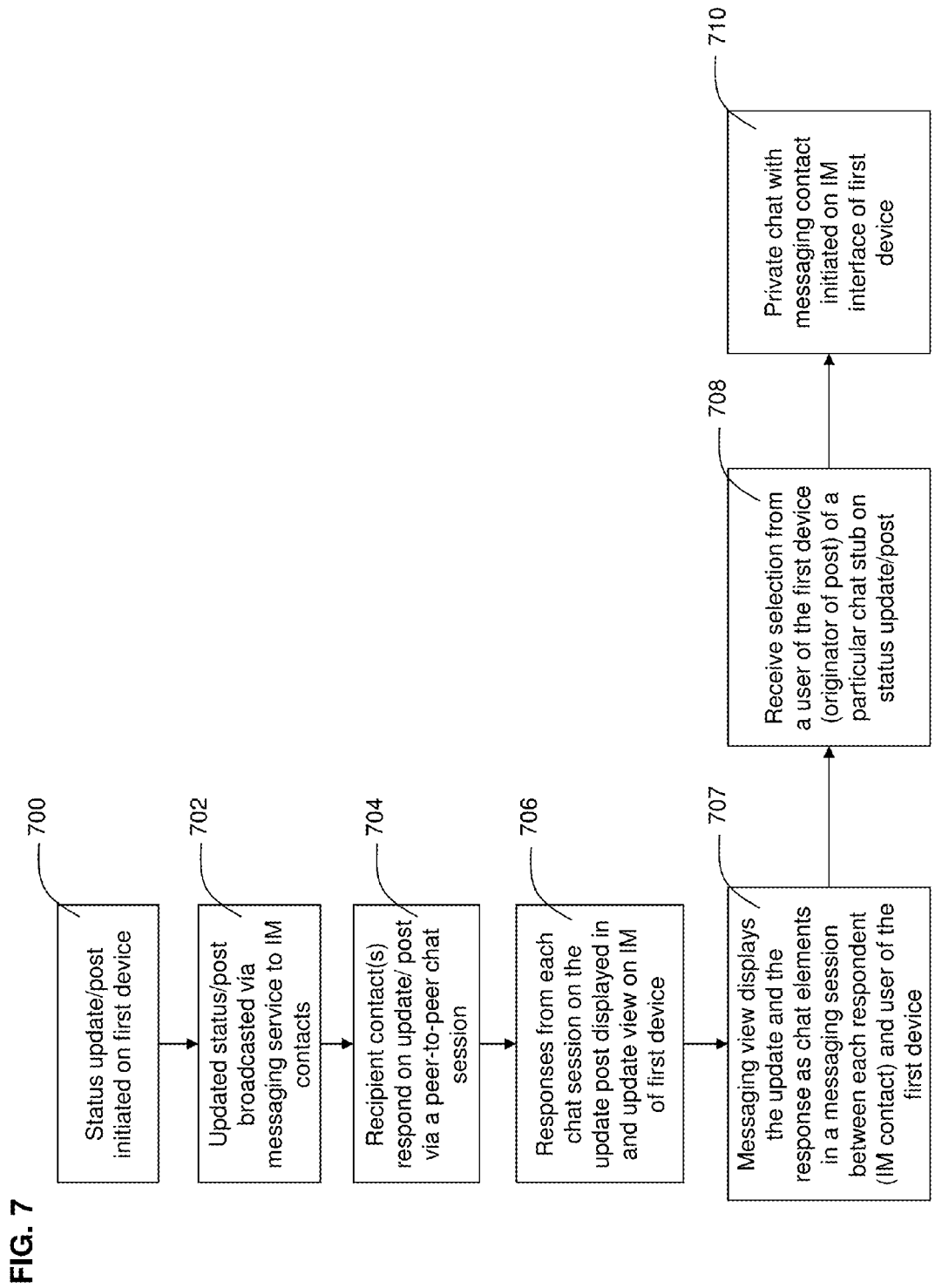
FIG. 7 illustrates a flow chart of an exemplary peer-to-peer chat communication shown in FIG. 6.

FIG. 7 refers to a flow chart for the process of sending a status update/post initiated on a first device (e.g. mobile device 100 in FIGS. 2 and 4) in an IM user interface and the initiation of a private chat. Referring to FIGS. 2 and 7, a status update/post is initiated by a first correspondent associated with the first device (e.g. mobile device 100) at step 700. The update status/post is broadcast to IM contacts using the IM messaging service at step 702 and at step 704 the recipients of the status update/post are able to provide a response on the update. On each recipient's device, the first correspondent's status update is displayed in an IM interface. A selected recipient (e.g. a second correspondent) can select the status update and initiate a chat session on the IM interface of the second correspondent's device between the first correspondent and the second correspondent. The second correspondent's device (e.g. device 202 in FIG. 2, 202A or 202B in FIG. 5) provides the response from their corresponding IM chat conversation with the first correspondent as a chat stub to the first correspondent's device for display on the IM interface (e.g. within an updates or timeline screen having the response appended to the activity update). Any responses initiated by the recipients of the update/post are received and displayed as chat stubs on the first device (e.g. mobile device 100 in FIGS. 2, 4 and 5) at step 706. That is, in the activity update view (e.g. update screen 402 in FIG. 5) of the first device 706 displays the response (received from the second correspondent in relation to the activity update) appended to the activity update (e.g. responses 504, and 506 in FIG. 5 appended to activity update 400). Further at step 707, in the messaging view (e.g. chat view 602 in FIG. 6) of the first correspondent device (e.g. device 100 in FIG. 6) there is displayed a messaging session between the first and the second correspondent devices, such that the messaging view displays the activity update in association with the response as chat elements (e.g. 400 and 600 in FIG. 6) within the messaging session (e.g. chat view 602 in FIG. 6).

Accordingly, as illustrated by FIGS. 6 and 7, the response received from a recipients (e.g. a second correspondent) as appended to the activity update post on the update screen is linked to or cross-referenced to the chat element displayed in the messaging/chat view of a chat session between the first and the second correspondent. That is, in one aspect, the selection of the response on the activity update screen can initiate the display of the messaging view having the response and the activity update as chat elements within a chat session between the respondent (e.g. the second correspondent device) and the first correspondent device.

At step 708, a particular response (e.g. 504 in FIG. 6) on the first correspondent's status update can be selected by the originating poster of the status update (e.g. the first correspondent) and this initiates a private chat session via the IM user interface with the respondent (e.g. second correspondent) through the IM messaging service at step 710.

Figure 8:
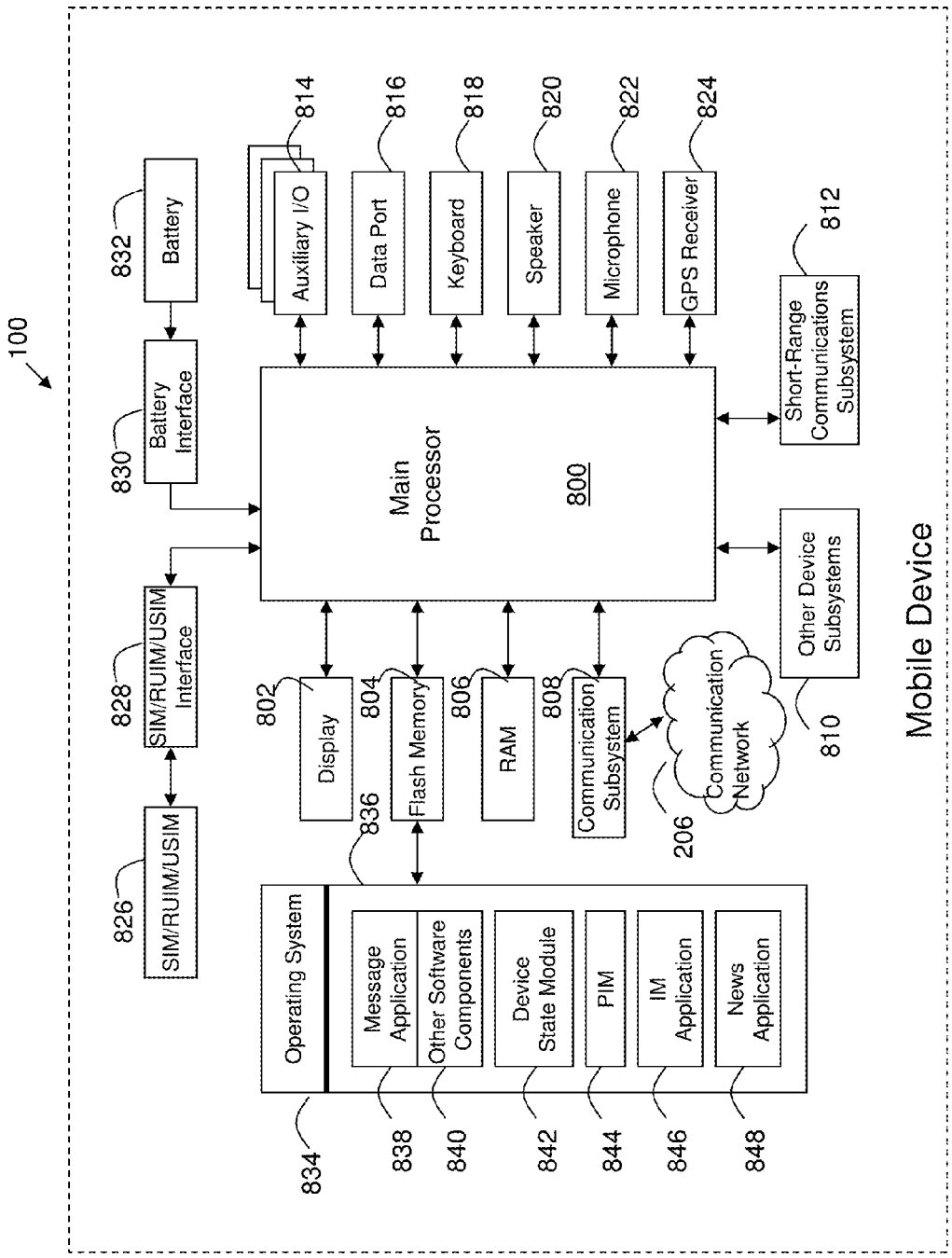
FIG. 8 is a block diagram of an example of a configuration for a mobile device.

Referring to FIG. 8, shown therein is a block diagram of an example of a mobile device 100. The mobile device 100 comprises a number of components such as a main processor 800 that controls the overall operation of the mobile device 100. Communication functions, including data and voice communications, are performed through a communication subsystem 808. The communication subsystem 808 receives messages from and sends messages to a communication network 206 (e.g. chat stubs and other identifiers for a chat session between a user of the mobile device 100 and another correspondent such as timestamp, read or delivered notification on chat stubs). In this example of the mobile device 100, the communication subsystem 808 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication subsystem 808 with the communication network 206 represents one or more different Radio Frequency (RF) channels, operating according to defined protocols specified for GSM/GPRS communications. With newer network protocols, these channels are capable of supporting both circuit switched voice communications and packet switched data communications.

The main processor 800 also interacts with additional subsystems such as a Random Access Memory (RAM) 806, a flash memory 804, a display 802, an auxiliary input/output (I/O) subsystem 814, a data port 816, a keyboard 818, a speaker 820, a microphone 822, GPS receiver 824, short-range communications subsystem 812 and other device subsystems 810.

Some of the subsystems of the mobile device 100 perform communication-related functions, whereas other subsystems may provide "resident" or on-device functions. By way of example, the display 802 and the keyboard 818 may be used for both communication-related functions, such as entering a text message for transmission over the network 206, and device-resident functions such as a calculator or task list.

The mobile device 100 can send and receive communication signals over the communication network 206 after required network registration or activation procedures have been completed. Network access is associated with a subscriber or user of the mobile device 100. To identify a subscriber, the mobile device 100 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 826 is to be inserted into a SIM/RUIM/USIM interface 828 in order to communicate with a network. Once the SIM/RUIM/USIM 826 is inserted into the SIM/RUIM/USIM interface 828, it is coupled to the main processor 800. The SIM/RUIM/USIM 826 may store additional subscriber information for a mobile device as well, including datebook (or calendar) information and recent call information. Alternatively, user identification information can also be programmed into the flash memory 804.

The mobile device 100 is typically a battery-powered device and includes a battery interface 830 for receiving one or more batteries 832 (typically rechargeable). In at least some examples, the battery 832 can be a smart battery with an embedded microprocessor. The battery interface 830 is coupled to a regulator (not shown), which assists the battery 832 in providing power V+ to the mobile device 100. Although current technology makes use of a battery, future technologies such as micro fuel cells may provide the power to the mobile device 100.

The mobile device 100 also includes an operating system 834 and software components 836 which are described in more detail below. The operating system 834 and the software components 836 that are executed by the main processor 800 are typically stored in a persistent store such as the flash memory 804, which may alternatively be a read-only memory (ROM) or similar storage element (not shown). Those skilled in the art will appreciate that portions of the operating system 834 and the software components 836, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, may be installed on the mobile device 100 during its manufacture. Other software applications include a message application 238 that can be any suitable software program that allows a user of the mobile device 100 to send and receive electronic messages. Various alternatives exist for the message application 838 as is well known to those skilled in the art. Messages that have been sent or received by the user are typically stored in the flash memory 804 of the mobile device 100 or some other suitable storage element in the mobile device 100. In at least some examples, some of the sent and received messages may be stored remotely from the mobile device 100 such as in a data store of an associated host system that the mobile device 100 communicates with.

The software applications can further comprise a device state module 842, a Personal Information Manager (PIM) 844, and other suitable modules (not shown). The device state module 842 provides persistence, i.e. the device state module 842 ensures that important device data is stored in persistent memory, such as the flash memory 804, so that the data is not lost when the mobile device 100 is turned off or loses power.

The PIM 844 includes functionality for organizing and managing data items of interest to the user, such as, but not limited to, e-mail, contacts, calendar events, voice mails, appointments, and task items. A PIM application has the ability to send and receive data items via the communication network 206. PIM data items may be seamlessly integrated, synchronized, and updated via the communication network 206 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

FIG. 8 also illustrates the IM application 846 and news application 848 which, as discussed above, utilize the communication subsystem 808 to communicate with corresponding messaging and data channels respectively.

Other types of software applications or components 840 can also be installed on the mobile device 100. These software applications 840 can be pre-installed applications (i.e. other than message application 838) or third party applications, which are added after the manufacture of the mobile device 100. Examples of third party applications include games, calculators, utilities, etc.

The additional applications 840 can be loaded onto the mobile device 100 through at least one of the communication network 206, the auxiliary I/O subsystem 814, the data port 816, the short-range communications subsystem 812, or any other suitable device subsystem 810. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 816 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 816 can be any suitable port that enables data communication between the mobile device 100 and another computing device. The data port 816 can be a serial or a parallel port. In some instances, the data port 816 can be a Universal Serial Bus (USB) port that includes data lines for data transfer and a supply line that can provide a charging current to charge the battery 832 of the mobile device 100.

The short-range communications subsystem 812 provides for communication between the mobile device 100 and different systems or devices, without the use of the communication network 206. For example, the subsystem 812 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 808 and input to the main processor 800. The main processor 800 may then process the received signal for output to the display 802 or alternatively to the auxiliary I/O subsystem 814. A subscriber may also compose data items, such as e-mail messages, for example, using the keyboard 818 in conjunction with the display 802 and possibly the auxiliary I/O subsystem 814. The auxiliary I/O subsystem 814 may comprise devices such as: a touch screen, mouse, track ball, track pad, optical navigation module, infrared fingerprint detector, or a roller wheel with dynamic button pressing capability. The keyboard 818 is an alphanumeric keyboard and/or telephone-type keypad. However, other types of keyboards may also be used, such as a virtual or "soft" keyboard rendered as images on a touch screen. A composed item may be transmitted over the communication network 206 through the communication subsystem 808.

For voice communications, the overall operation of the mobile device 100 in this example is substantially similar, except that the received signals are output to the speaker 820, and signals for transmission are generated by the microphone 822. Alternative voice or audio I/O subsystems, such as a voice message recording subsystem, can also be implemented on the mobile device 100. Although voice or audio signal output is accomplished primarily through the speaker 820, the display 802 can also be used to provide additional information such as the identity of a calling party, duration of a voice call, or other voice call related information.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 100, any component of or related to the communication network 206, etc., or accessible or connectable thereto. Any application or module herein described may be implemented using computer readable/executable instructions that may be stored or otherwise held by such computer readable media.

FIGS. 9A, 9B and 9C illustrate exemplary screen shots of IM user interfaces and incorporating chat stubs into the updates screen of an IM user interface. The updates screen as illustrated in FIGS. 9A-9B provides a feed or listing of all contacts associated with the user and updates/posts made by the user and/or associated contacts and/or updates/posts from the channels subscribed to by the user. A first correspondent device 900 is shown with an exemplary feed as displayed on the updates screen 901 of the IM UI showing the posts and updates made by the user of the first correspondent device 900 (e.g. a first correspondent "John Smith") and/or IM contacts of the first correspondent and the channels followed/subscribed by the first correspondent. An exemplary post 902 shows a sample chat stub indicating a response provided by the first correspondent on another contacts post (e.g. a second correspondent "Kaye Anderson"), the "D" associated with the chat stub provides an indication that the message in the chat stub has been delivered but not yet read by the receiving device.

A user-initiated status update or post 904 is made by the first correspondent device 900 in the form of posting a picture. Contacts of the device 900 can provide responses on the update 904 and this is seen by the device 900 and its user as a series of chat stubs 905 appended to the update/post 904 in this exemplary embodiment. The chat stubs 905 and 906 are only visible independently to the correspondents that initiated the particular response by initiating a private, peer to peer chat session with the first correspondent on their respective devices. The action 906 of selecting a particular chat stub initiates a private IM conversation with the commenter (e.g. the second correspondent "Kaye Anderson"). In FIG. 9C, a second correspondent device 908 is shown with a conversation initiated with the update/post originating device (e.g. first correspondent device 900). In this conversation window 910, past updates 914 and the subsequent responses 912 made by the participants of this conversation are also shown. It is noted in the example shown that chat stub generated by "Kaye Anderson" is only visible to "Kaye Anderson" and the first correspondent "John Smith". That is, the creator of the post/update can see all the stubs of all conversations around the post. Conversely, the initiator of the chat (e.g. providing a response to a status update/post) can only see its own chat stub related to the status update/post. As illustrated in FIGS. 9A-9C, starting a chat session (e.g. FIG. 9C) from a post (e.g. 904) leaves behind a stub of that chat in the timeline or update feed (e.g. 902). Selecting a stub allows the initiation of a chat session and in one aspect, a cleared or terminated chat conversation, clears or removes the chat stub (e.g. 902 may be cleared).

Figure 10B:
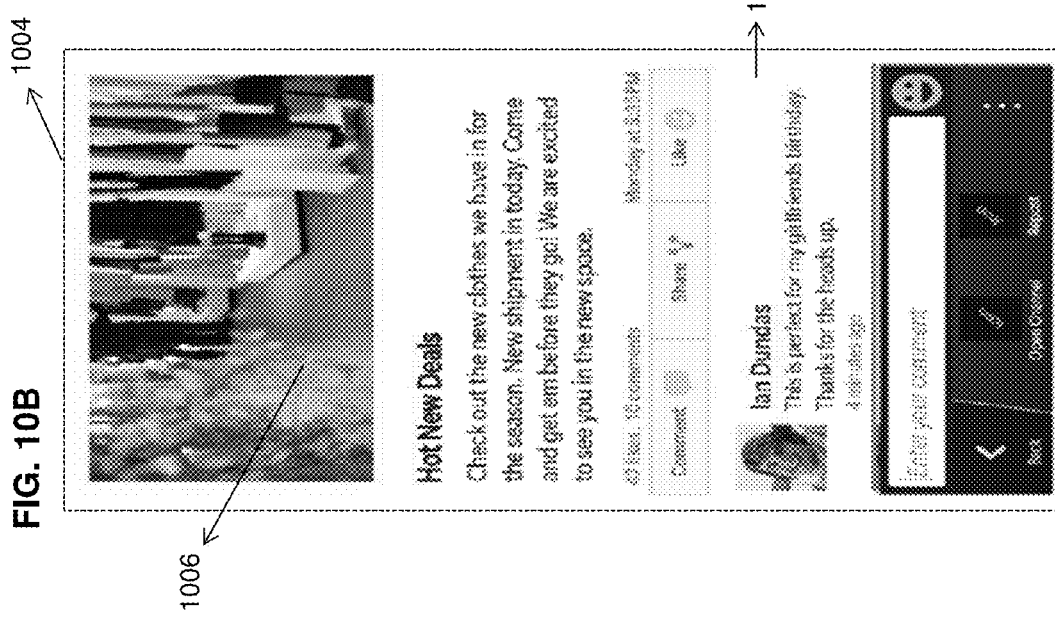
FIG. 10B is an exemplary screen shot for an IM user interface relating to comments posted in a feed; and, FIGS. 11A-11D are exemplary schematics displaying a first and second mobile devices, and their respective exchange of chat stubs in respective IM user interfaces.
Figure 10A:
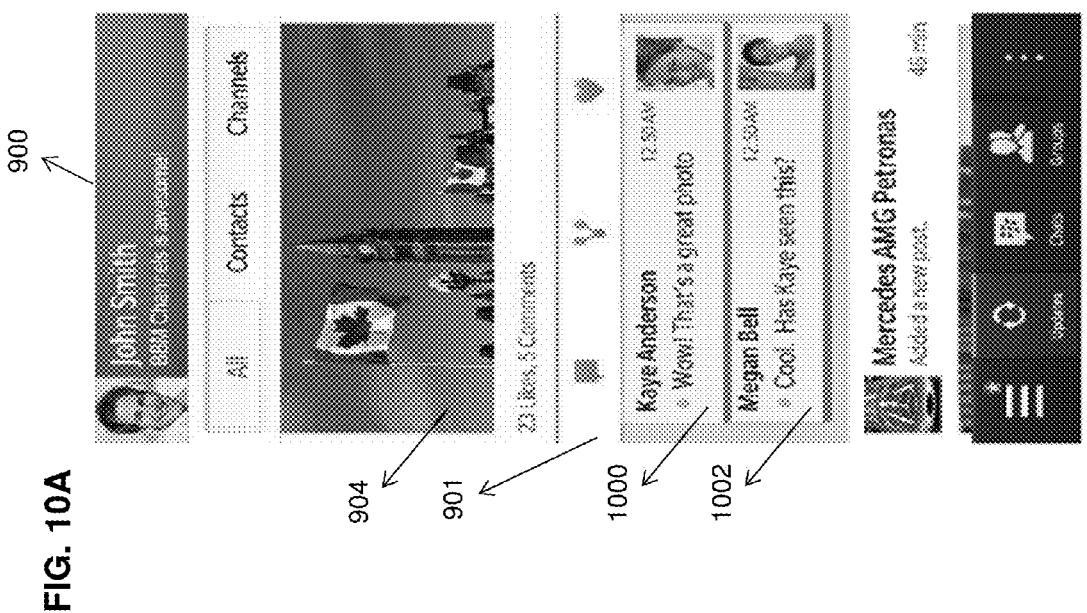

FIGS. 10A and 10B illustrate exemplary embodiments of an IM screen displaying status updates and the responses received on them (a stub of the chat session relating to the status update), as well as a channel feed showing a broadcasted post by a channel and corresponding comments 1008. A status update 904 made by the first correspondent device 900 is shown. The update 904 is shown along with other posts on the devices IM user interface feed 901. Chat stubs 1000 and 1002 are present on the broadcasted post. In this exemplary embodiment, both chat stubs 1000 and 1002 are visible to the broadcasting device but the chat commenters are not aware of others who have responded on the broadcasted post in a private chat session with the user of the first correspondent device 900.

FIG. 10B illustrates a post 1006 made by a channel. This post is shown in the channels feed 1004. A comment made by a follower/subscriber 1008 is also shown. The comments are differentiated from the chat stubs as comments are ongoing, communal and less time dependent. Conversely, the chat stubs are more time dependent and immediate and appended to a post such that they are private and peer to peer visible. That is, only the people in the chat session used to respond to a post are able to see the corresponding chat stubs in their timeline.

FIG. 11 illustrates one exemplary embodiment for incorporating chat stubs in an IM messaging interface, wherein the first mobile device 1100 of user S initiates a status update 1102. This status update 1102 gets responses in the form of "stubs" from User C and User D as seen at 1104 and 1106 respectively. Contact initiated status update 1108 as well as a response stub 1110 are also seen on the device 1100 of User S. A click or selection 1112 of the contact initiated status update 1108 initiates a chat session 1114 between User S with User C. The mobile device 1116 of user C can see a status update 1102 by user S, and only the stub 1106 made by User C on status 1102. The mobile device 1116 of user C initiates a status update 1108 with a chat stub 1110 by user S. A click or selection 1118 of the contact initiated status update 1104 initiates a chat session 1120 with User A on the device 1116 of user C.

Figure 12:
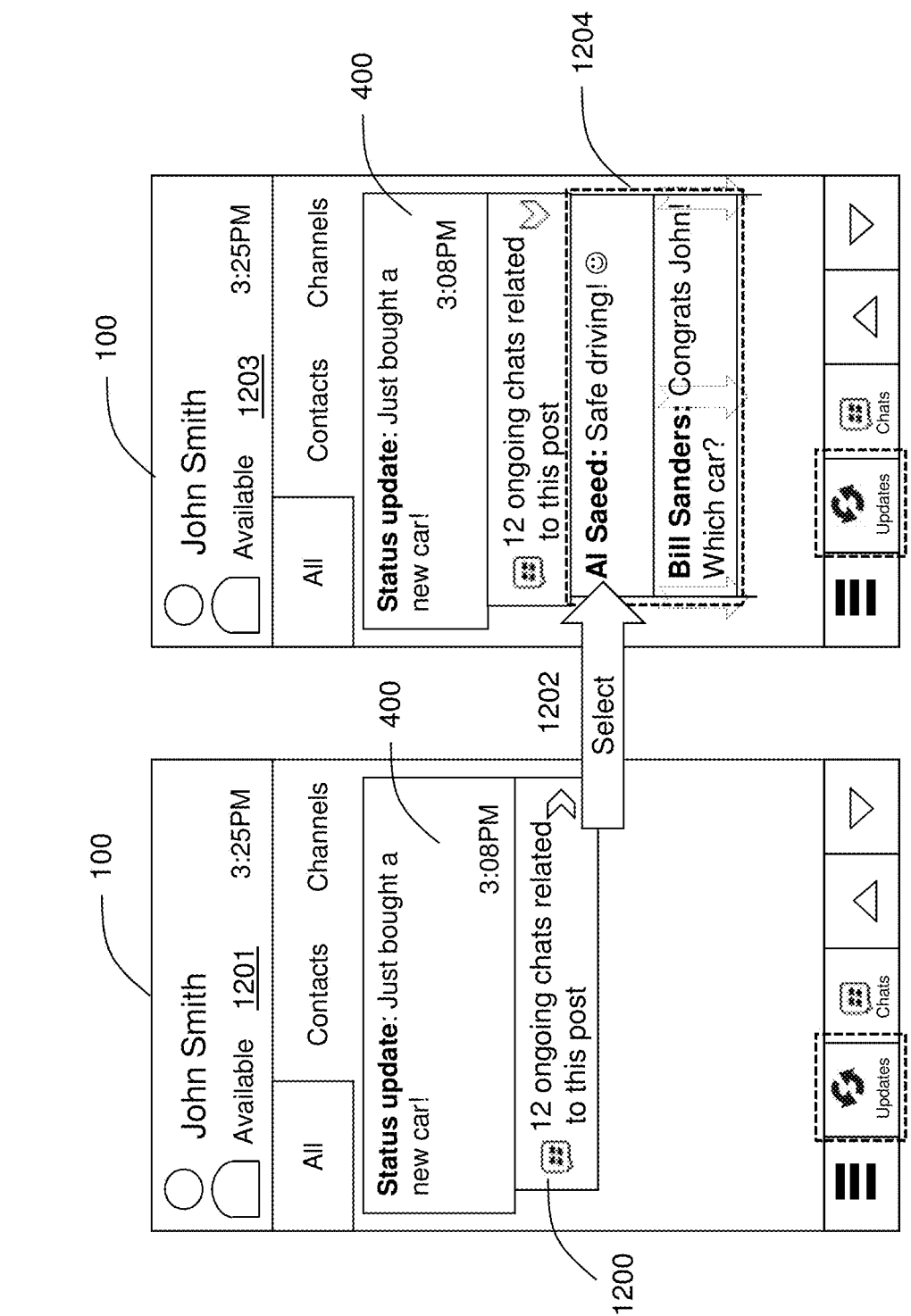
FIG. 12 illustrates exemplary schematics for the display screen of a mobile device in displaying multiple chat stubs associated with a status update/post on an IM interface.

FIG. 12 illustrates exemplary screen shots of the IM interface for the mobile device 100 when displaying a summarized view 1201 of a number of chat stubs, shown as a group icon 1200, in accordance with an embodiment. According to this embodiment, chat stubs are displayed in a manner that minimizes the visual display area used on the screen when more than one stub is present on a particular status update/post 400. The chat stubs are bundled into a group icon 1200 which provides a summary (e.g. textual and/or graphical) of the total number of chat stubs associated with the status update/post 400 and other identification text (e.g. summary of chat stubs). The group icon 1200 on the IM interface can be selected (e.g. selection 1202) by a user such as to collapse/open the group icon 1200 shown in screen 1203, making the individual chat stubs 1204 viewable to the user of the mobile device 100. The individual chat stubs 1204 can be selected as described herein for initiating an IM chat session with the commentor that initiated the chat stub 1204.

Figure 13:
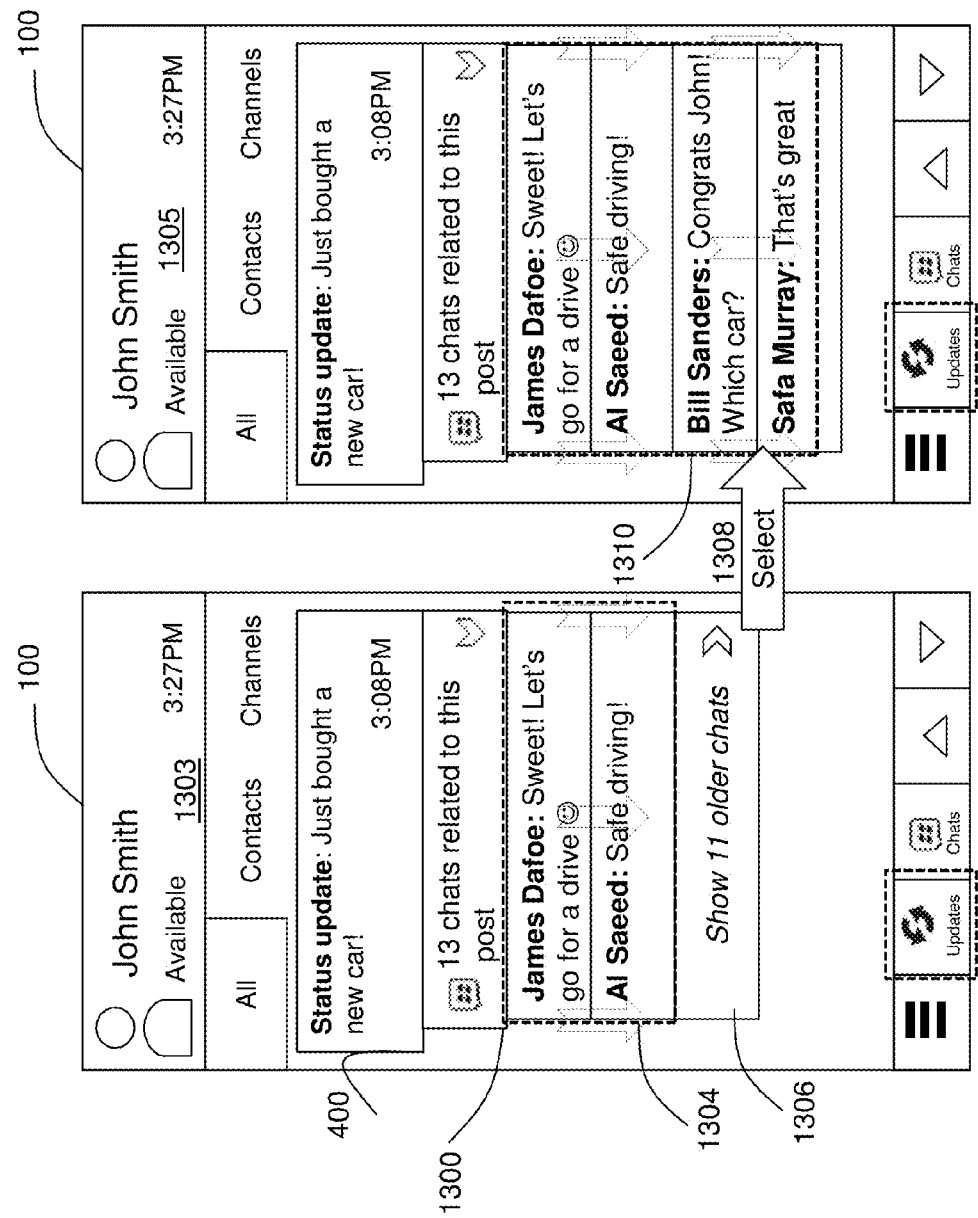
FIG. 13 is an exemplary schematic of displaying multiple chat stubs associated with a status update on an IM interface with older messages bundled into a secondary group.

FIG. 13 illustrates exemplary screen shots 1303 and 1305 of the IM interface for the mobile device 100 for displaying chat stubs in a condensed manner when more than one chat stub is present in response to the status update 400, in accordance with another embodiment. In accordance with the present embodiment, the chat stubs are bundled into a summarized group which provides a group icon 1300 indicating the number of responses related to the update/post 400 and a display of a predefined number of recent listings of chat stubs 1304 (e.g. chronological listing) related to the post 400 (shown in screen shot 1303). The group icon 1300 and/or "show older chats" icon 1306 can be selected (e.g. tapping the screen) 1308 by the user of the mobile device 100. The selection 1308 expands the group 1304 (shown in screen shot 1305) making all of the bundled chat stubs viewable in a chronological sequence 1310 to the user of the device 100. In the embodiment illustrated, the criteria for choosing the select number of individual chat stubs to display in screen 1303 is based upon the time of the response such that only recent chat stubs are shown. However, it can be appreciated that in other embodiments the display criteria for truncating the number of chat stubs can be altered.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art.

The invention claimed is:

1. A method performed by a first mobile device, the method comprising:

detecting at the first mobile device an activity update to an account associated with the first mobile device;

communicating the activity update to at least one account contact;

receiving at the first mobile device a response to the communicated update from the at least one account contact, the response being an initiation of a private chat electronic conversation originated from the at least one account contact to the account;

displaying in a display on an instant messaging user interface of the first mobile device:

an activity update view screen that displays the activity update and displays the response appended to the activity update as a chat stub that includes the private chat electronic conversation formed by the activity update and the response, wherein the activity update is displayed visually differentiated in the activity update view screen from the chat stub, the activity update being displayed not time dependent from any other activity update displayed in the activity update view screen, and wherein the chat stub being displayed in chronological order relative to any other chat stub displayed in the activity update view screen appended to the activity update, and including an indicator displayed in each chat stub that displays whether the chat stub was read or delivered, the chat stub displayed in the activity update view screen being selectable to initiate instant messaging with the at least one account contact; and a messaging view of a messaging session between the account and the at least one account contact, the messaging session being a private chat electronic conversation, the messaging view being displayed in response to a selection input of the chat stub displayed in the activity update view screen, the messaging view comprising a chat window that displays, visually separate from the activity update view screen, the activity update in association with the chat stub associated with the response.

2. The method of claim 1 wherein the activity update being displayed in association with the response are displayed as corresponding chat elements within the messaging session between the account and the at least one account contact.

3. The method of claim 1 further comprising receiving a selection input of the chat stub displayed in the activity update view, and displaying the messaging view of the messaging session between the account and the at least one account contact.

4. The method of claim 3 wherein the selection input initiates an instant messaging session with the at least one account contact.

5. The method of claim 1 further comprising: communicating the activity update to a plurality of account contacts, receiving a plurality of respective responses from the plurality of account contacts; displaying in the display of the first mobile device:
the activity update view screen having each of the plurality of respective responses displayed appended to the displayed activity update as corresponding chat stubs for the plurality of respective responses, each of the corresponding chat stubs displayed in the activity update view screen being selectable to initiate instant messaging privately correspondingly with each account contact of the plurality of account contacts; and
the messaging view with each of the plurality of account contacts comprising a chat window that displays, visually separate from the activity update view screen, the activity update and an associated response from the each of the plurality of respective responses as the corresponding chat stubs.

6. The method of claim 5 further comprising: receiving a selection input of a chat stub displayed in the activity update view, and in response initiating instant messaging privately correspondingly between the account and a corresponding account contact of the plurality of account contacts.

7. The method of claim 5, wherein the plurality of respective responses is displayed in chronological order of occurrence.

8. The method of claim 5, wherein displaying the activity update view having each of the plurality of respective responses appended to the activity update further comprises: displaying a group icon indicating a summarized view of the plurality of respective responses, the summarized view selectable for expanding the group icon and displaying each of the plurality of respective responses in the activity update view where each of the plurality of respective responses are each portions of the electronic conversations of the chat stub selectable for initiating an instant messaging session with a corresponding account contact corresponding to each of the plurality of respective responses.

9. The method of claim 1, wherein the chat stub comprises a most recent portion of a conversation or chat session.

10. The method of claim 1, wherein the chat stub comprises a time stamp for the conversation associated with the status update or post or a visual indication of whether the chat stub has been delivered or read by a recipient of an instant message in an instant messaging session.

11. The method of claim 1, wherein the response displayed on the activity update view comprises at least a portion of the messaging session related to the activity update between the account and the at least one account contact.

12. The method of claim 11, wherein the display of the response in the activity update is confidential between the account and the at least one account contact participating in the messaging session related to the activity update.

13. The method of claim 11, wherein the response displayed on the activity update view further comprises a visual indicator to indicate whether the response is delivered or read by the account.

14. The method of claim 11 further comprising: receiving a subsequent response from the at least one account contact associated with the activity update in the messaging session and replacing the response with the subsequent response appended to the activity update in the activity update view as the chat stub from the at least one account contact.

15. The method of claim 11 further comprising: receiving at least one subsequent response from the at least one account contact associated with the activity update in the messaging session and further appending the at least one subsequent response with the response appended to the activity update in the activity update view.

16. The method of claim 1 wherein the activity update is selected from the group comprising: a status update and a new post initiated by the account.

17. A non-transitory computer readable medium comprising computer executable instructions that when executed by a computing device cause the computing device to perform the operations comprising:
detecting at the computing device an activity update to an account associated with the computing device;
communicating the activity update to at least one account contact;
receiving at the computing device a response to the communicated update from the at least one account contact, the response being an initiation of a private chat electronic conversation originated from the at least one account contact to the account;
displaying in an instant messaging user interface of a display of the computing device:
an activity update view screen that displays the activity update and displays the response appended to the activity update as a chat stub that includes the private chat electronic conversation formed by the activity update and the response, wherein the activity update is displayed visually differentiated in the activity update view screen from the chat stub, the activity update being displayed not time dependent from any other activity update displayed in the activity update view screen, and wherein the chat stub being displayed in chronological order relative to any other chat stub displayed in the activity update view screen appended to the activity update, and including an indicator displayed in for each chat stub that displays whether the chat stub was read or delivered, the chat stub displayed in the activity update view screen being selectable to initiate instant messaging with the at least one account contact; and
a messaging view of a messaging session between the account and the at least one account contact, the messaging view displaying the activity update in association with the response including the chat stub associated with the response, the portions of the electronic conversation of the chat stub being selectable to initiate instant messaging with the at least one account contact the messaging session being a private chat electronic conversation, the messaging view being displayed in response to a selection input of the chat stub displayed in the activity update view screen, the messaging view comprising a chat window that displays, visually separate from the activity update view screen, the activity update in association with the chat stub associated with the response.

18. A mobile device, comprising:
one or more processors;
a display operatively coupled to the one or more processors; and
a non-transitory computer readable memory operatively coupled to the one or more processors, the memory storing computer executable instructions that when executed cause the one or more processors to perform the operations comprising:
  detecting at the mobile device an activity update to an account associated with the mobile device;
  communicating the activity update to at least one account contact;
  receiving at the mobile device a response to the communicated activity update from the at least one account contact, the response being an initiation of a private chat electronic conversation originated from the at least one account contact to the account;
  displaying in an instant messaging user interface in the display of the mobile device:
    an activity update view screen that displays the activity update and displays the response appended to the activity update as a chat stub that includes the private chat electronic conversation formed by the activity update and the response, wherein the activity update is displayed visually differentiated in the activity update view screen from the chat stub, the activity update being displayed not time dependent from any other activity update displayed in the activity update view screen, and wherein the chat stub being displayed in chronological order relative to any other chat stub displayed in the activity update view screen appended to the activity update, and including an indicator displayed in each chat stub that displays whether the chat stub was read or delivered, the chat stub displayed in the activity update view screen being selectable to initiate instant messaging with the at least one account contact; and
    a messaging view of a messaging session between the account and the at least one account contact, the messaging view displaying the activity update in association with the response including the chat stub associated with the response, the portions of the electronic conversation of the chat stub being selectable to initiate instant messaging with the at least one account contact the messaging session being a private chat electronic conversation, the messaging view being displayed in response to a selection input of the chat stub displayed in the activity update view screen, the messaging view comprising a chat window that displays, visually separate from the activity update view screen, the activity update in association with the chat stub associated with the response.

19. The mobile device of claim 18, wherein the mobile device communicates the activity update to a plurality of account contacts, receives one or more respective responses from the plurality of account contacts, and further displays in the user interface in the display of the mobile device:
  the activity update view screen having each of the plurality of respective responses displayed appended to the displayed activity update as corresponding chat stubs for the plurality of respective responses, each of the corresponding chat stubs displayed in the activity update view screen being selectable to initiate instant messaging privately correspondingly with each account contact of the plurality of account contacts; and
  the messaging view with each of the plurality of account contacts comprising a chat window that displays, visually separate from the activity update view screen, the activity update and an associated response from the each of the plurality of respective responses as the corresponding chat stubs.

\* \* \* \* \*